Figure 1:
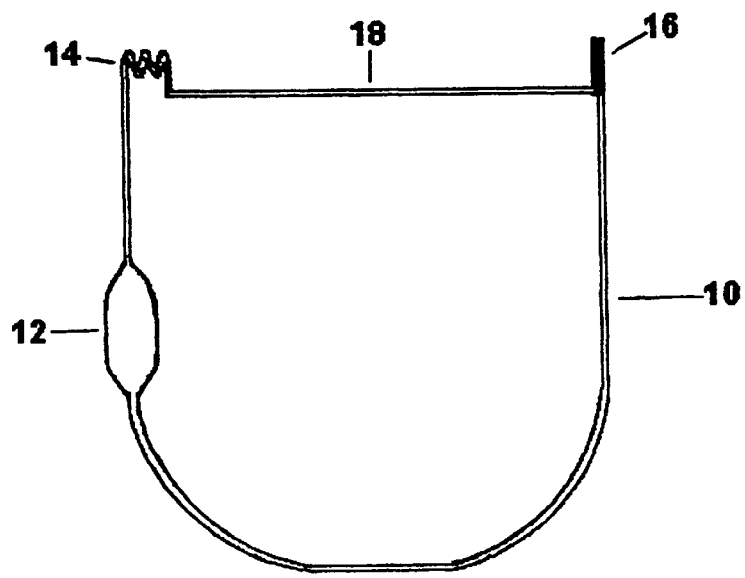

United States Patent

Strampe

Patent Number: 6,047,493
Date of Patent: Apr. 11, 2000

[54] TIP AND SLIP BOTTOM BOUNCER

[76] Inventor: Clarence W Strampe, 6101 Foxdale St., Sioux Falls, S. Dak. 57107-1025

[21] Appl. No.: 09/223,430

[22] Filed: Dec. 30, 1998

Related U.S. Application Data

[60] Provisional application No. 60/070,001, Dec. 30, 1997.

[51] Int. Cl.[7] .................................................. A01K 95/00
[52] U.S. Cl. .................... 43/44.96; 43/44.97; 43/44.87
[58] Field of Search ................................ 43/44.87, 44.9, 43/44.94, 44.96, 44.97

[56] References Cited

U.S. PATENT DOCUMENTS

| | | |
|---|---|---|
| 2,217,972 | 10/1940 | Smith . |
| 2,739,404 | 3/1956 | Koester, Sr. . |
| 3,120,715 | 2/1964 | Long . |
| 3,514,891 | 6/1970 | Krull . |
| 4,161,838 | 7/1979 | Gapen ................................. 43/42.11 |
| 4,989,360 | 2/1991 | Lewis ................................. 43/42.49 |
| 5,369,905 | 12/1994 | DeMars ................................. 43/42.74 |
| 5,595,016 | 1/1997 | Feher ................................. 43/44.87 |

*Primary Examiner*—Jack W. Lavinder

[57] ABSTRACT

A fishing apparatus having special utilities for trolling or drift fishing for bottom feeding fish. It is constructed of rust-proof wire (10) with a set of small coils (14) connecting with a crossmember (18) to a set of larger coils (16) on the top and a unique U shaped body (10) which attaches to the weight (12). Each part of the apparatus being designed for a specific purpose. The small coils (14) being designed to wrap the fishing line (22) with swivel (20) attached through, therefore eliminating the necessity of cutting and tying the fishing line (22) and at the same time acting as a stop mechanism to prevent the apparatus from falling off of the fishing line (22). The larger coils (16) being designed to slip the leader line (24) through and attach it to the swivel (20), they being large enough to allow the fishing line (22) with swivel (20) attached and leader line (24) to move freely through them. The apparatus being able to move freely on the fishing line (22) without causing a tug when a fish takes the bait. The U shaped body (10) having the weight attached being designed to carry the lure, spinner, hook and bait to the bottom of the body of water, being rounded at the bottom allowing it to bounce.

1 Claim, 2 Drawing Sheets

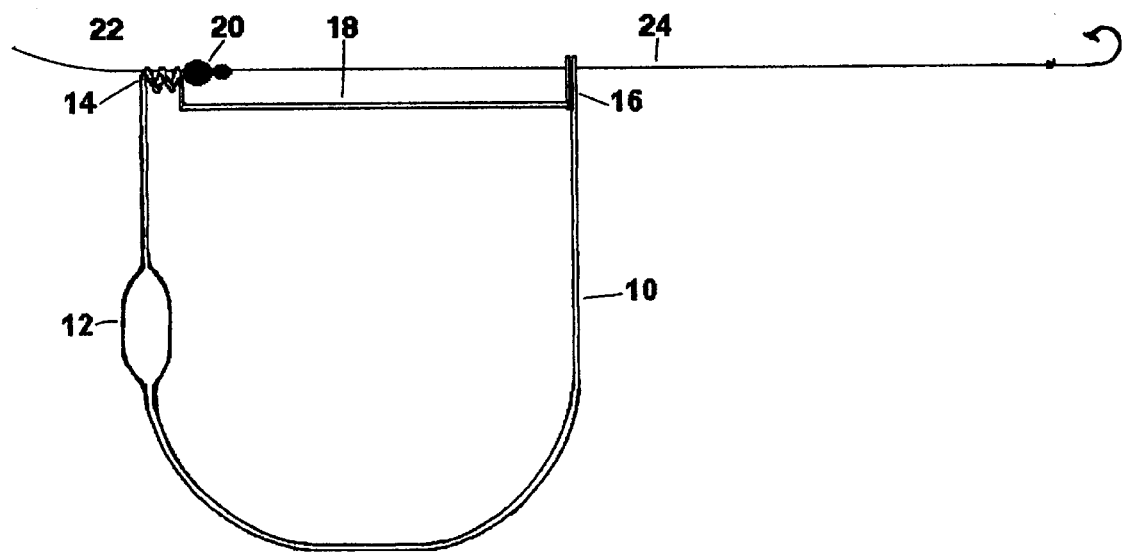

TIP AND SLIP BOTTOM BOUNCER

BACKGROUND—FIELD OF INVENTION

This application claims the benefit of Provisional Patent Application Ser. No. #60/070,001 filed Dec. 30, 1997.

BACKGROUND—DESCRIPTION OF PRIOR ART

In the past many types of sinkers and weights have been used to carry the fishing lure down to the bottom of a body of water with the goal of hooking the larger species of fish which are primarily bottom feeders.

Inventors have tried every means to create an apparatus to bring the lure down without startling the fish.

When a weight is tied to a line it must move with the line; therefore, when a fish strikes at the lure it will pull not only on the bait but also on the weight causing a resistance and frightening the fish away. Weights attached to a long thin wire as well as weights tied directly to a fishing line tend to stir up the bottom of the body of water and can easily become lodged in obstructions.

One of the obstacles people must overcome when using these weights is the cutting of the fishing line and retying the knot each time they require a new weight. Individuals with failing eyesight or arthritic conditions in the hands have found this to be cumbersome and in some cases impossible to do without the help of another individual.

OBJECTS AND ADVANTAGES

Accordingly, several advantages exist in my present invention:

(a) the present invention is rounded at the bottom, allowing the apparatus to bounce over obstacles without becoming lodged.

(b) a weight is on the side of the apparatus, not on the bottom, therefore the likelihood of stirring up silt from the bottom of the body of water is greatly reduced.

(c) a weight is not tied to the line but rather wrapped onto the fishing line, making it simple to attach by anyone.

(d) a weight rides freely on the fishing line, therefore when a fish takes the lure there is no tug from the weight.

DRAWING FIGURES

FIG. 1 showing a side view of the apparatus

Figure 2:
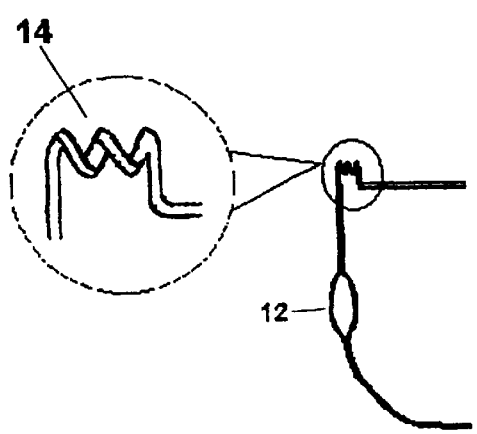

FIG. 2 showing an enlargement of the small coils

Figure 3:
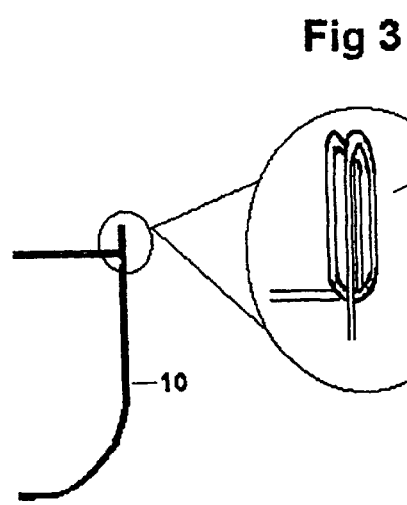

FIG. 3 showing an enlargement of the large coils

FIG. 4 showing apparatus attached to a fishing line with swivel and fishing hook attachment

REFERENCE NUMERALS IN DRAWINGS 10 rust proof spring wire formed in a U shape
12 weight
14 small coils
16 large coils
18 crossmember
20 swivel
22 fishing line
24 leader line

SUMMARY

A fishing weight apparatus designed to be attached to a fishing line without tying allowing it to freely move on the line without the fish feeling the weight.

DESCRIPTION—FIGS. 1,2,3,4

All figures are drawn for ease of explanation of the basic teachings of the present invention only.

Referring to FIG. 1 a side view of the apparatus whereby one single strand of rust-proof spring wire 10 is bent and manipulated into a U shape. Continuing on it is wrapped into large coils 16. It is brought across to form a crossmember 18. It is then wrapped to form small coils 14 and finally the remainder of the rust-proof spring wire 10 meets up with the beginning part and they are joined by the means of a weight 12.

Referring to FIG. 2 showing an enlargement of the small coils 14 made by winding the rust-proof spring wire 10 around in a spring like manner.

Referring to FIG. 3 showing an enlargement of the large coils 16 made by winding the rust-proof spring wire 10 around in a spring like manner larger than the small coils 14.

Referring to FIG. 4 showing the apparatus attached to a fishing line 22 with swivel 20 and fishing hook attachment to illustrate the placement of this present invention on the fishing line 22.

OPERATION—FIG. 4

Referring to FIG. 4 showing a side view of the apparatus. Small coils 14 are designed for wrapping a fishing line 22 with a swivel 20 attached through. They being small enough to act as a stop when the swivel 20 comes in contact with them. Large coils 16 are designed to be large enough to thread the leader line 24 which contains the hook and spinner through and pull said leader line 24 along the crossmember 18 and connect it to the swivel 20. The U shape of the rust-proof spring wire 10 allows it to bounce along the bottom of a body of water and over obstructions. The weight 12 has been placed in such a manner allowing it to be high enough not to become lodged in obstructions while at the same time holding the fishing hook assembly near or on the bottom.

CONCLUSION, RAMIFICATIONS, AND SCOPE

Accordingly, the reader will see that the unique shape and design of this fishing apparatus will benefit the fishing sportsperson in the following ways It will no longerbe necessary to cut your fishing line and re-tie it each time you want to change the weight. This will be a benefit to persons with arthritic conditions in their hands or persons whose eyesight is failing.

Apparatus is not tied to the line, therefore, it will ride freely on the line. This will eliminate the tug when a fish takes the lure.

Apparatus is rounded on the bottom. This will allow it to bounce over obstacles without becoming lodged.

Although the description above contains specificities, these should not be construed as limiting the scope of the invention but as merely providing illustrations of some of the presently preferred embodiments of this invention.

Thus the scope of the invention should be determined by the appended claims and their legal equivalents.

What is claimed is:

1. A slip sinker for attachment to a fishing line comprising a single unitary member having
   a small coil and a large coil for receiving the fishing line wherein the coils allow the slip sinker to move freely on the fishing line;
   a straight cross member connected between the small coil and the large coil;

a u-shaped member having a first leg, a second leg, a bottom curved portion and a weight, wherein the first leg is attached to the end of the small coil, the second leg is attached to the end of the large coil and the weight is connected and formed around the first leg in a position spaced from the bottom portion of the u-shaped member;

whereby the position of the weight on the first leg allows the bottom portion of the slip sinker to bounce along the bottom floor of the body of water without becoming lodged in obstructions on the bottom floor of the body of water.

* * * * *